Patented Aug. 17, 1937

2,089,971

UNITED STATES PATENT OFFICE

2,089,971
CONDENSATION PRODUCTS OF 2.3-HYDROXYNAPHTHOIC ACID

Rudolf Lesser, Berlin, Germany, assignor to General Aniline Works, Inc., New York, N. Y., a corporation of Delaware No Drawing. Application August 11, 1934, Serial No. 739,473. In Germany August 30, 1933

3 Claims. (Cl. 260—32)

The present invention relates to condensation products of 2.3-hydroxynaphthoic acid with anthranilic acid amide or its substitution products, more particularly it relates to compounds which may be represented by the formula:

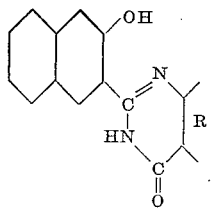

wherein

stands for a radical of the benzene series free from substituents which cause solubility in water, but which may contain substituents, such as alkyl, alkoxy, halogen, the nitro group and the like.

My new compounds of the above-identified formula are obtainable by reacting upon 2.3-hydroxynaphthoic acid with anthranilic acid amide or a nuclear substitution product thereof in the presence of a dehydrating agent. Advantageously the process is carried out in two steps by first reacting upon 2.3-hydroxynaphthoic acid chloride with anthranilic acid amide or a substitution product thereof respectively, whereby the 2.3-hydroxynaphthoyl-anthranilic acid amide is obtained, and then performing the ring closure. The process can be illustrated by the following scheme:

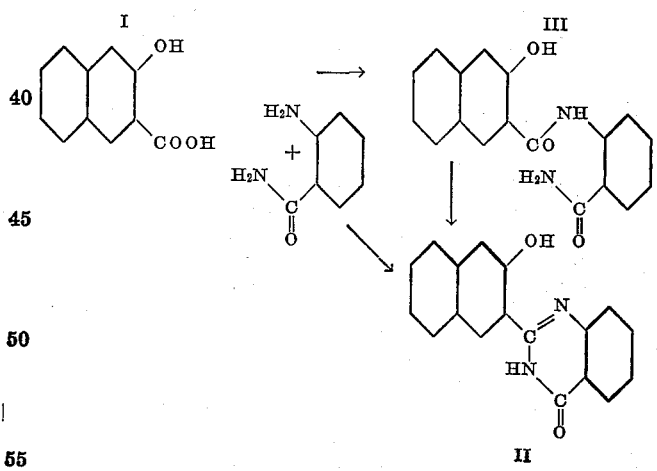

The ring closure from III to II very easily enters and can be performed, for example, by heating the substance sub III at or above its melting point respectively, or by heating the same in a suitable neutral agent, such as glycerine, or in a potassium-sodium-acetate melt. It can already be performed at low temperature if a condensing agent is added, for example, when working in boiling amylalcohol in the presence of potassium acetate or when introducing the compound into a sodium-chloride-aluminium-chloride melt. Most practically the ring closure is performed by heating and dissolving the substance sub III in aqueous caustic alkali lye. On cooling, the alkali metal salt of the new compound indicated above sub II which is difficultly soluble in excess alkali separates; it easily can be isolated, and with the aid of acids the free compound can be obtained. Or otherwise the free compound can be obtained by introducing carbon-dioxide into the hot alkaline solution whereby the free compound is precipitated.

It has already been known that the benzoyl- (and also the acetyl-) anthranilic acid amide having the formula:

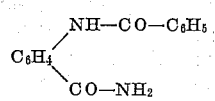

yields the corresponding condensation product by splitting off water (see Körner, Journal für praktische Chemie, N. F. vol. 36, page 155); however, from this, the chemical behaviour of the 2.3-hydroxynaphthoyl-anthranilic acid amides could not be foreseen, it rather could be expected that the hydroxy group in o-position would influence the proceeding of the reaction. First of all it could not be expected that the new condensation products would have the valuable properties of the 2.3-hydroxynaphthoic acid arylamides and therefore would be important intermediate products for the manufacture of dyestuffs of good fastness properties.

The invention is illustrated by the following examples, without being limited thereto, the parts being by weight:

*Example 1.*—To a suspension of 18.8 parts of 2.3-hydroxynaphthoic acid and 13.6 parts of anthranilic acid amide in about 200 parts of toluene are dropped, while stirring, 10 parts of phosphorus trichloride in 30 parts of toluene. After this the mixture is refluxed with stirring, until the development of hydrochloric acid has ceased, whereby the reaction product separates in form of a yellowish resin. After distilling off the toluene with steam, the precipitate is filtered from the aqueous medium which still contains unchanged hydroxynaphthoic acid. The precipitate consisting of a mixture of hydroxynaphthoic acid and the new condensation product is dissolved in dilute aqueous caustic soda solution, and from the solution the condensation product is precipitated by passing in carbon-dioxide. By again dissolving in aqueous caustic soda lye with the addition of charcoal, filtering and precipitating with carbon-dioxide it is further purified. By recrystallizing from nitrobenzene, the new condensation product which corresponds to the following formula:

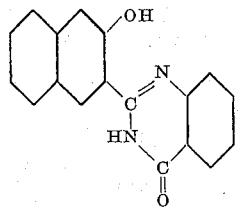

is obtained in form of yellow lustrous plates or needles, melting between 340 and 350° C. (corrected); the melting point is not sharp.

*Example 2.*—18.8 parts of 2.3-hydroxynaphthoic acid and 11.9 parts of thionylchloride are heated with 30 parts of toluene with the exclusion of moisture at 80–90° C., until a clear solution is obtained and the development of hydrochloric acid has ceased. Then the 2.3-hydroxynaphthoyl-anthranilic acid amide (sub III) is formed by introducing the solution of the 2.3-hydroxynaphthoic acid chloride in portions and with stirring to a warm solution of 13.6 parts of anthranilic acid amide in 300 parts of toluene, and refluxing the mixture, until hydrochloric acid no longer escapes. After cooling, the crystalline precipitate is filtered with suction, washed with toluene and dried. The yield is about 25–26 parts. By concentrating the toluene mother liquor there is obtainable a mixture of unchanged 2.3-hydroxynaphthoic acid and hydroxynaphthoyl anthranilic acid amide, which due to its insolubility in aqueous soda solution, easily can be separated from the mixture. The new compound crystallizes from dichlorobenzene in yellowish needles which at about 270° C. give off water with foaming, and then again solidify, while ring closure to the condensation product sub II enters.

The ring closure can also be performed by various other methods:

(*a*) By dissolving the 2.3-hydroxynaphthoyl anthranilic acid amide in dilute aqueous caustic soda lye; for example, 25 parts of the crude amide are dissolved in 250 parts of aqueous caustic soda lye of 4% strength, while heating, the solution is filtered, if necessary, while still boiling, and the sodium salt crystallizing on cooling in orange-yellow lustrous plates, being difficultly soluble in excess caustic soda lye, is filtered with suction. After washing with a small quantity of a strongly diluted aqueous caustic soda lye the salt is decomposed by digesting with an acid. The yield is about 20 to 22 parts. From the alkaline mother liquor there is obtained a small quantity of the impure product by passing in carbon-dioxide, and finally by acidifying with a mineral acid a small quantity of 2.3-hydroxynaphthoic acid is regained.

(*b*) By introducing into threefold the quantity of a melt consisting of equal parts of anhydrous sodium- and potassium-acetate at about 240° C., while stirring, and heating to 260° C., whereby the melt firstly thick again becomes thinly liquid. After cooling, it is treated with water, the undissolved condensation product is filtered with water and purified by dissolving in aqueous caustic soda lye and precipitating.

(*c*) By heating in the presence of a high-boiling indifferent liquor. 10 parts of the compound are introduced into 50 parts of glycerine at about 200° C., while stirring. On boiling for a short time, the crystallized reaction product forms which is isolated in the usual manner.

(*d*) By heating in the presence of a condensing agent. A suspension of 10 parts of the compound with 5 parts of molten potassium acetate in 300 parts of amylalcohol is heated to boiling for several hours with stirring. The crystalline reaction product separating on cooling is filtered with suction, washed with methanol and water and dried.

Or at about 220° C. 10 parts of the compound are introduced into a melt from 12 parts of sodium chloride and 27 parts of sublimed aluminium chloride, and after this, stirring is continued for a short time. After cooling, the melt is digested with water and with the addition of hydrochloric acid, and the insoluble reaction product is filtered with suction and washed. For purifying, it is dissolved in aqueous caustic soda lye, to which charcoal has been added. The solution is filtered, and the free compound is isolated in the usual manner.

*Example 3.*—The solution of the 2.3-hydroxynaphthoic acid chloride in toluene, prepared in accordance with Example 2, from 18.8 parts of 2.3-hydroxynaphthoic acid and 11.8 parts of thionylchloride, is added to a hot solution of 17 parts of 4-chloro-2-aminobenzamide in about 40-fold its quantity of toluene, and the mixture is refluxed until the development of hydrochloric acid has ceased. (4-chloro-2-aminobenzamide is obtainable in the known manner by treating the corresponding isatoic acid anhydride—prepared by the action of phosgene upon a soda alkaline solution of 4-chloro-2-amino-benzoic acid—with aqueous ammonia. From dilute methanol colorless crystals of the melting point 181–182° C. (corrected)). The crude product obtained by filtering with suction, washing with toluene and drying, is digested after pasting with methanol which acts as a wetting agent with dilute aqueous soda solution for removing some hydroxynaphthoic acid. Thus are obtained about 27 parts of chloro-(4)-hydroxynaphthoylamino-(2)-benzamide, and by working up the mother liquor, there are obtainable about further 3 parts of the compound in a less pure form. The amide is easily soluble in hot nitrobenzene and crystallizes from its nitrobenzene solution in yellowish microscopic needles having no sharp melting point, but undergoing decomposition with darkening at about 300° C. The crude product is boiled with about 40-fold its quantity of an aqueous caustic soda lye of 2% strength, and after filtering from some impurities, the condensation product corresponding to the following formula:

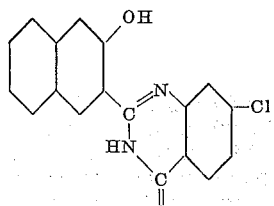

is precipitated from the boiling solution by passing in carbon-dioxide. The yield is about 25 parts. Analytically pure it is obtained by recrystallizing from nitrobenzene in form of yellowish, pearly crystals, decomposing without a sharp melting point with darkening above 300° C.

*Example 4.*—By substituting in Example 3 the 4-chloro-2-amino-benzamide by the 5-chloro-2-amidobenzamide (obtainable from the corresponding chloroisatoic acid anhydride with the aid of aqueous ammonia) and otherwise working according to the directions given in Example 3, there is at first obtained the chloro-(5)-hydroxynaphthoyl-amido-(2)-benzamide (crystallizing from dichlorobenzene in yellowish, microscopic needles, decomposing above 280° C. with darkening), and by treating the same with dilute caustic soda lye, the corresponding condensation product in an output of about 24 to 25 parts. The pure compound of the following formula:

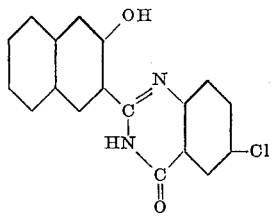

crystallizes from nitrobenzene in golden lustrous plates, decomposing without sharp melting point above 300° C. with darkening.

*Example 5.*—By substituting in Example 3, the 4-chloro-2-benzamide by the 4-methyl-2-amidobenzamide (obtainable from 4-methyl-2-aminobenzonitrile by saponification) and otherwise working according to the directions given in Example 3, there is at first obtained the methyl-(4)-hydroxynaphthoylamido-(2)-benzamide crystallizing from nitrobenzene in yellowish needles which melt at 273° C. with decomposition, and by treating the same with dilute caustic soda lye, the corresponding condensation product of the following formula:

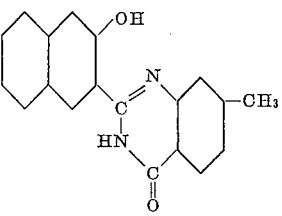

crystallizing from nitrobenzene, decomposing above 300° C., is obtained.

*Example 6.*—By substituting in Example 3 the 4-chloro-2-aminobenzamide by the 4-methoxy-2-amidobenzamide (obtainable by transforming 1-amino-2-nitro-4-methoxybenzene into the nitrile, reducing the nitro group to the amino group and saponifying the aminonitrile group; crystallizing from methanol in crystals of the melting point 157° C.), and otherwise working according to the directions given in Example 3, there is at first obtained the methoxy-(4)-hydroxynaphthoylamido-(2)-benzamide, crystallizing from nitrobenzene in yellowish needles which melt at 276° C. with decomposition, and by treating the same with dilute caustic soda lye, the corresponding condensation product of the following formula:

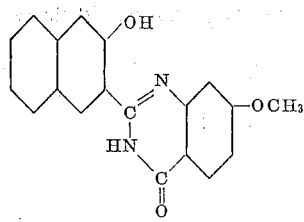

crystallizing from nitrobenzene and melting with decomposition above 315° C., is obtained.

*Example 7.*—By substituting in Example 3 the 4-chloro-2-aminobenzamide by the 5-chloro-4-methoxy-2-aminobenzamide (obtainable by toluene-sulfonating 1-amino-4-methoxy-5-chlorobenzene, nitrating the toluenesulfo compound, saponifying the toluene sulfo group, transforming the amino group in the 1-position into the nitrile group, and reducing the same to the 5-chloro-4-methoxy-2-aminobenzamide with zinc dust ammonium chloride in aqueous alcohol of 50% strength, crystallizing from metanol in crystals of the melting point 190° C.), and otherwise working according to the directions given in Example 3, there is at first obtained the methoxy-(4)-chloro-(5)-hydroxynaphthoylamido-(2)-benzamide, crystallizing from nitrobenzene in yellowish needles which melt at 288° C. with decomposition, and by treating the same with dilute caustic soda lye, the corresponding condensation product of the following formula:

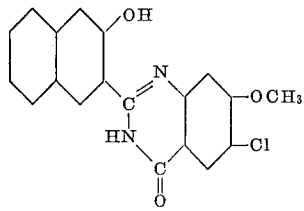

crystallizing from nitrobenzene in yellow crystals which melt above 300° C. with decomposition, is obtained.

*Example 8.*—By substituting in Example 3 the 4-chloro-2-aminobenzamide by the 5-bromo-2-aminobenzamide (obtainable by oxidation of 5-bromoisatine with chromic acid and glacial acetic acid to the corresponding bromoisatoic acid anhydride and heating the latter with concentrated aqueous ammonia solution; from ethanol needles of the melting point of 181° C. (see Dorsch, Journal für praktische Chemie, (2), vol. 33, page 35, melting point 177° C.), and otherwise working according to the directions given in Example 3, there is at first obtained the bromo-(5)-hydroxynaphthoylamino-(2)-benzamide, crystallizing from nitrobenzene in yellow needles which melt at 295° C. with decomposition, and by treating the same with dilute caustic soda lye the corresponding condensation product of the following formula:

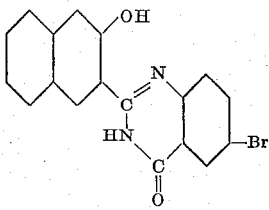

crystallizing from nitrobenzene in orange-yellow crystals which melt above 300° C. with decomposition, is obtained.

I claim:

1. 2.3-hydroxynaphthoic acid derivatives of the formula:

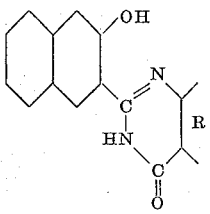

wherein

R stands for a radical of the benzene series free from substituents which cause solubility in water, being generally yellowish crystalline substances, soluble in alkalies and being valuable intermediate products for the manufacture of dyestuffs.

2. 2.3-hydroxynaphthoic acid derivatives of the formula:

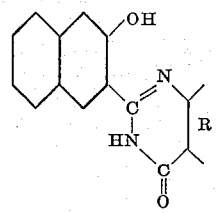

wherein

stands for a radical selected from the group consisting of phenylene and alkyl, alkoxy, halogen or nitro substituted phenylenes, being generally yellowish crystalline substances, soluble in alkalies and being valuable intermediate products for the manufacture of dyestuffs.

3. The compound of the following formula:

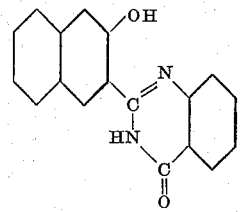

crystallizing from nitrobenzene in yellow lustrous plates or needles, melting with decomposition between 340 and 350° C., and being a valuable intermediate product for the manufacture of dyestuffs.

RUDOLF LESSER.